United States Patent [19]

Abe et al.

[11] Patent Number: 4,927,488

[45] Date of Patent: May 22, 1990

[54] APPARATUS FOR COVERING A TIRE BEAD WITH A TAPE

[75] Inventors: Norio Abe; Osamu Fukaura, both of Kodaira, Japan

[73] Assignee: Bridgestone Corporation, Tokyo, Japan

[21] Appl. No.: 208,538

[22] Filed: Jun. 20, 1988

[30] Foreign Application Priority Data

Jun. 18, 1987 [JP]  Japan .................. 62-150158

[51] Int. Cl.⁵ ............... B29D 29/06; B29D 30/48; B29D 30/32
[52] U.S. Cl. .................... 156/460; 156/136; 156/132; 156/175; 156/463
[58] Field of Search ............ 156/136, 422, 460, 461, 156/463, 555, 132, 130.7, 398, 175, 400, 539

[56] References Cited

U.S. PATENT DOCUMENTS 4,061,525 12/1977 Slezak ........................... 156/460

FOREIGN PATENT DOCUMENTS

52-2433 1/1978 Japan ............................ 156/460

Primary Examiner—Robert A. Dawson
Assistant Examiner—Gregory J. Wilber
Attorney, Agent, or Firm—Sughrue, Mion, Zinn, Macpeak & Seas

[57] ABSTRACT

A rotatably supported annular tire bead is rotated by drive rollers held in contact with the inner circumferential surface of the bead, and during rotation of the bead a tape is fed and stuck onto the inner circumferential surface of the bead. The opposite side edge portions of this tape extending from this bead are stuck onto the opposite side surfaces of the bead by being pinched from the opposite sides by flange portions of the drive rollers and flange members opposed thereto, subsequently the opposite side edge portions of the tape are folded back onto the outer circumferential surface of the bead by means of scraper members, and thus the bead is perfectly covered by the tape. The above-mentioned flange members are fitted around the drive rollers so as to be slidable in the axial direction, and they are biased to reduce the intervals between the flange members and the flange portions of the drive rollers. Furthermore, there is provided expanding means for expanding the above-mentioned intervals.

9 Claims, 6 Drawing Sheets

APPARATUS FOR COVERING A TIRE BEAD WITH A TAPE

BACKGROUND OF THE INVENTION:

The present invention relates to an apparatus for covering a tire bead with a tape so that deformation may not arise in the tire bead.

As a tape covering technique for a bead, the technique disclosed in Japanese Patent Publication No. 52-2433 (1977) was proposed in the prior art. According to this proposed technique, a tape is successively stuck onto an outer circumferential surface of a bead, both side edge portions of the tape are folded back step by step and stuck to the bead gradually from the side surfaces of the bead to the inner circumferential surface thereof, and to that end, drive rollers for gradually folding back a tape are successively arrayed from the upstream side to the downstream side.

Accordingly, a great many drive rollers are necessitated, as the rollers for folding back the tape a six rollers are necessitated, and further, pinch rollers or the like for pressing the tape are required. Since these fold-back rollers are all driven, the driving system becomes complex. In addition, a part of the fold-back rollers have flanges along both of their edges and would fold back the tape so as to pinch the bead from the opposite sides thereof. However since the flanges are fixed to the roller by means of setscrews, the apparatus cannot versatilely deal with distribution of the widths of the beads, which causes inconveniences such as no-good insert, no-good take-out or the like. Moreover, when the apparatus is switched to beads having a different size, adjustment of an interval between the flanges is always necessitated, so that a lot of labor and time are required for the switching work. This becomes also a bar against automation of take-out of the beads.

SUMMARY OF THE INVENTION:

The present invention has been worked out in view of the above-mentioned situation of the prior art, and one object of the present invention is to provide, at a low cost, an apparatus for covering a tire bead with a tape, which has basic component elements reduced, which makes insert and take-out of a bead sure end easy, and which can be automatically adapted to various sizes.

According to one feature of the present invention, there is provided an apparatus for covering a tire bead with a tape comprising drive rollers held in contact with an inner circumferential surface of a rotatably supported annular tire bead to rotate the tire bead, tape feed means for sticking a tape onto the inner circumferential surface of the rotating tire bead while feeding the tape, flange members fitted around the above-mentioned drive rollers so as to be slidable in their axial direction for cooperating with flange portions provided on the above-mentioned drive rollers so that they may pinch the above-described bead jointly with the above-mentioned fed tape from the opposite sides to stick the tape onto the side surfaces of the bead, biasing means for biasing the same flange members so as to reduce the intervals between the above-mentioned flange portions and flange members, expanding means for expanding the intervals between the above-mentioned flange portions and flange members against the above-described biasing means, and tape fold-back means for folding back side edge portions of the tape onto the outer circumferential surface of the above-mentioned bead.

According to the present invention as featured above, owing to the combination of the flange members slidably fitted around the drive rollers and the tape foldback means, the basic component elements of the apparatus can be greatly saved and reduced. Since the intervals between the flange portions and the flange members can be automatically set by the biasing means, adjustment of the intervals upon switching the size of the beads is made unnecessary. In addition, by holding the intervals between the flange portions and the flange members in an expanded state by the expanding means, insert and take-out of beads can be achieved easily and surely, and so, occurrence of inconveniences such as no-good insert and/or no-good take-out can be prevented. Furthermore, as the tape is folded back from the inner circumferential surface of a bead towards its outer circumferential surface to cover the bead, generation of creases in the tape can be avoided.

DETAILED DESCRIPTION OF THE PREFERRED EMBODIMENT:

In the following, description will be made on one preferred embodiment of the present invention illustrated in FIGS. 1 through 8.

Figure 1:
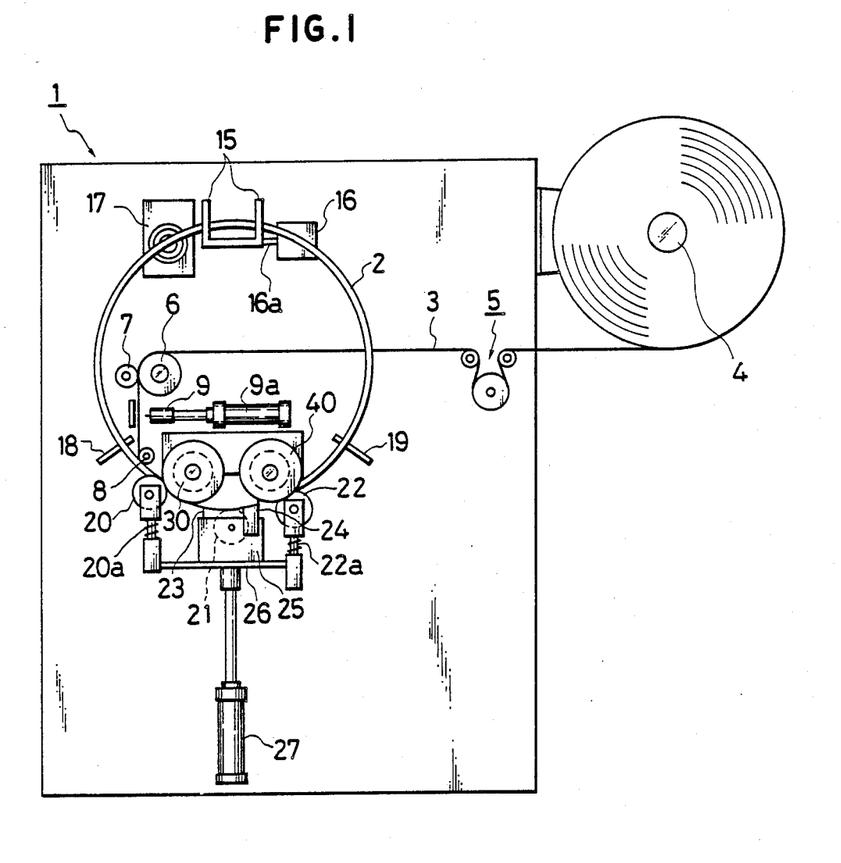
FIG. 1 is a general schematic front view of a tape covering apparatus according to one preferred embodiment of the present invention.

FIG. 1 is a general schematic front view of a tape covering apparatus 1 according to the present invention. An annular bead 2 is supported nearly vertically and in a rotatable manner with its lower outer circumferential portion supported by three bead push-up rollers 20, 21 and 22 and also with its upper portion hung by a pair of hook-like rods 15. The rods 15 have their base end portions fixed to a rotary shaft 16a of a rotor 16 for inserting and taking out a bead, hence by rotation of the rotor 16 they swing from the illustrated upright position to the forth and then to the beneath to make insert and take-out of the bead 2 possible. At the position adjacent to the rods 15 is disposed an approach sensor 17 so that the set condition of the bead 2 can be detected.

Among the above-mentioned push-up rollers 20, 21 and 22, the bead push-up roller 21 at the center supports the lowermost end portion of the bead 2, and this bead push-up roller 21 is rotatably supported on a support table 25 which is in turn fixed on an elevator table 26. The bead push-up rollers 20 and 22 disposed on the left and on the right, respectively, of the roller 21 are supported from the above-described elevator table 26 via compression springs 20a and 22a, respectively. The support table 25 can be vertically raised or lowered by driving an elevator cylinder 27 positioned thereunder. In addition to the above-mentioned support table 25 are fixed scrapers 23 and 24 for folding back a tape, on the left and right of the bead push-up roller 21.

On the right of and behind the set bead 2 is rotatably supported a reel 4, which has a tape 3 for covering the bead 2 wound therearound. The tape 3 consists of a fiber fabric impregnated with rubber, which has a slight elasticity and stickiness. This tape 3 is paid out from the reel 4, then it is wound by about ¼ circumference in the anticlockwise direction about a drive roller 6 disposed inside of the bead 2 for drawing out the tape via a length measuring devise 5 and travels downwards (reference numeral 7 designates a pinch roller). While the tape 3 is being pinched between the inner circumferential surface of the bead 2 and a tape pressing roller 8 held in press-contact with the inner circumferential surface of the bead 2, it is stuck onto the inner circumferential surface of the bead 2 in accordance with rotation in the anticlockwise direction of the bead 2. In addition, between the drive roller 6 and the pressing roller 8 is positioned a cutter 9, and by driving an air-cylinder 9a the tape can be cut into an appropriate length.

At the positions held in contact with the lower inner circumferential surface of the set bead 2, are disposed drive rollers 30 and 40 for rotating the bead 2 in juxtaposition on the left and right. One drive roller 40 is held at the position where it is opposed to the above-mentioned bead push-up roller 22 with the bead 2 intervening therebetween.

If the elevator table 26 is lowered by driving the elevator cylinder 27, then the push-up rollers 20, 21 and 22 decend integrally with the elevator table 26, and hence, insert and take-out of the bead 2 would become possible. After the bead was inserted and it has been perfectly set, the bead push-up rollers 20, 21 and 22 are pushed up to support the bead 2 from the below. At the same time, on the inside of the bead 2, the drive rollers 30 and 40 would come into contact with the inner circumferential surface of the bead 2 so as to press it downwards. As a result of rotation of the drive rollers 30 and 40, the bead 2 is rotated jointly with the tape 3.

Figure 2:
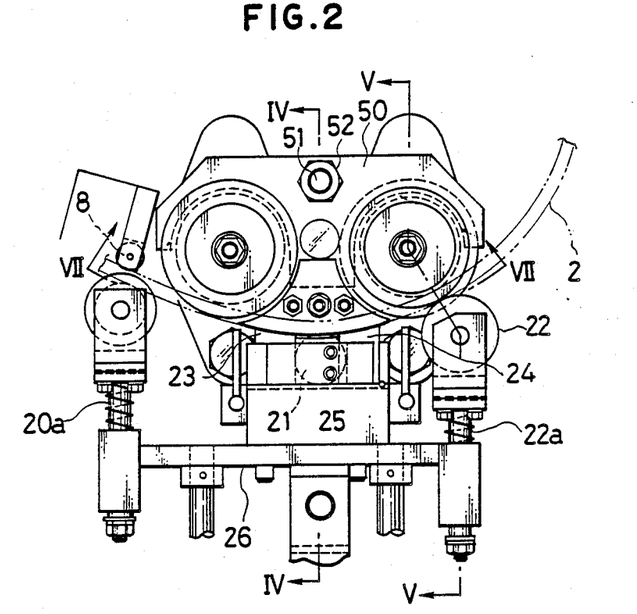
FIG. 2 is a front view of a drive roller section in the same apparatus.
Figure 3:
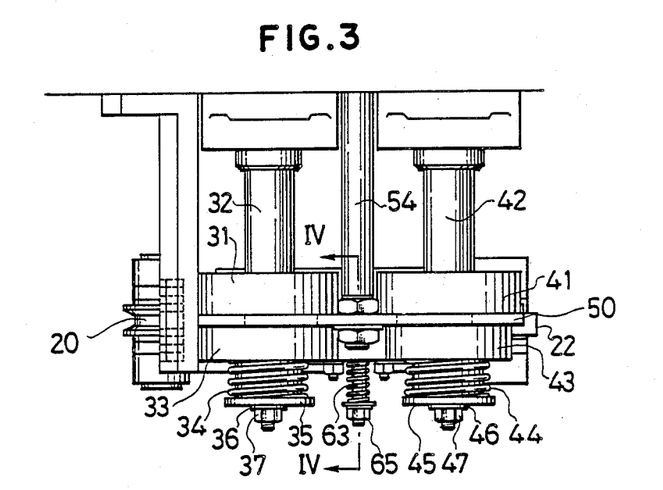
FIG. 3 is a plan view of the same section.
Figure 4:
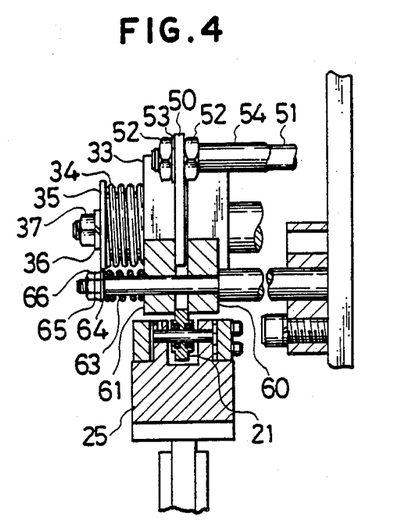
FIG. 4 is a cross-section view taken along line IV—IV in FIGS. 2 and 3.
Figure 5:
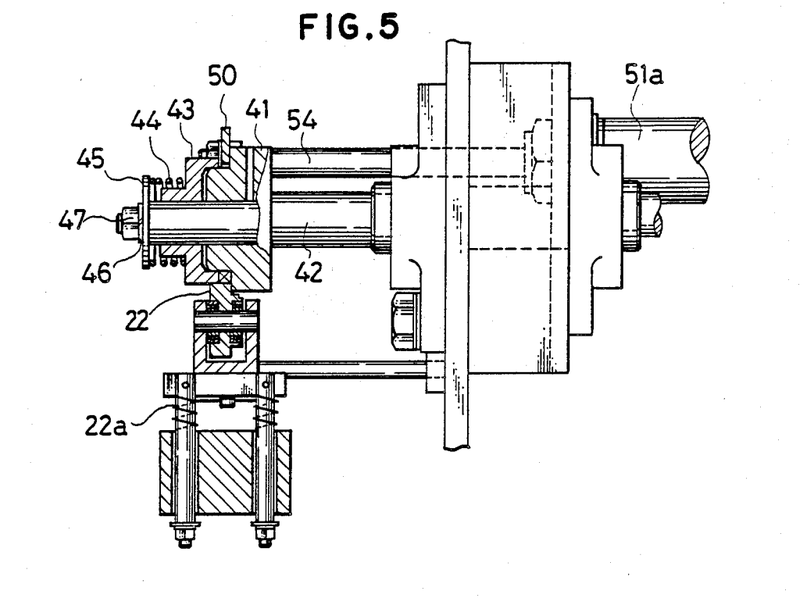
FIG. 5 is a cross-section view taken along line V—V in FIG. 2.
Figure 6:
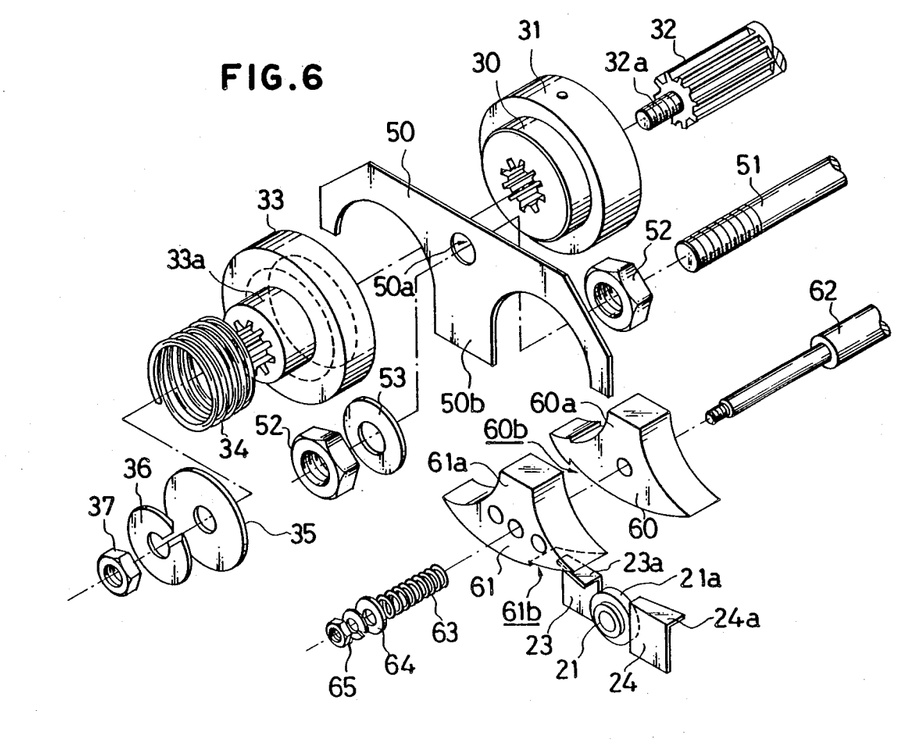
FIG. 6 is a disintegrated perspective view of the same drive roller section.

In the following, details of the section of the drive rollers 30 and 40 will be described with reference to FIGS. 2 through 6. FIG. 2 is a front view of the same section, FIG. 3 is a plan view of the same, FIG. 4 is a cross-section view taken along line IV—IV in FIGS. 2 and 3, and FIG. 5 is a cross-section view taken along line V—V in FIG. 2. In addition, FIG. 6 is an exploded perspective view of the same section, and as will be best seen from this figure, the above-described drive roller 30 has a flange portion 31 formed integrally at the rear and is adapted to be integrally fitted at a predetermined position around a drive shaft 32 which penetrates through the same drive roller 30. As opposed to the flange portion 31 of the drive roller 30, a slide flange member 33 having on its rear surface a recess for somewhat inserting the same drive roller 30 is spline-fitted around the drive shaft 32 and positioned in front of the flange portion 31. The same slide flange member 33 has a cylindrical projection 33a formed on its front surface, and a compression spring 34 is adapted to be disposed around the outer circumference of the same projection 33a.

After the drive roller 30 has been fixed at a predetermined position on the drive shaft 32, the front end portion of the above-described drive shaft 32 is made to penetrate through the slide flange member 33. A compression spring 34 is disposed around the outer circumference of the projection 33a, a receiving metal 35 butts against the front end portion of the compression spring 34, further a washer 36 is placed thereon, and a nut 37 is threadedly mated with a male screw portion 32a having a smaller diameter that is provided at the tip end portion of the drive shaft 32 penetrating through these members. In this way, the compression spring 34 has its front end surface locked by the receiving metal 35 to always bias the slide flange member 33 backwards. Accordingly, the tip end of the drive roller 30 is held fitted in the recess on the rear surface of the slide flange member 33.

The above-described construction is also the same with respect to the righthand drive roller 40 (omitted in FIG. 6). A flange potion 41 is integrally formed with the drive roller 40 and they are penetrated by a drive shaft 42. A slide flange member 43 is positioned in opposition to the flange portion 41, and the slide flange member 43 is biased backwards by a compression spring 44 which has its front end locked by a receiving metal 45 fixedly secured to the tip end of the drive shaft 42.

An expanding plate 50 is positioned to straddle the left and right drive rollers 30 and 40 from above. The expanding plate 50 has circular notches somewhat larger in diameter than the drive rollers 30 and 40 in its left and right halves, and if the above-mentioned circular notches are aligned with the center axes of the drive roller 30 and 40 at a predetermined position of the expanding plate 50, then a positional relationship such that while straddling the drive rollers 30 and 40, the flange portions 31 and 41 are located behind the expanding plate 50 and the slide flange members 33 and 43 are located in front of the expanding plate 30, is established. The expanding plate 50 has a circular hole 50a at its upper central portion, and the expanding plate 50 is fixedly secured to a tip end portion of a cylinder rod 51 penetrating through this circular hole 50a from the backside by being fastened by means of nuts 52 via a washer 53 from the back and forth. Accordingly, when the cylinder rod 51 is pushed forwards by a cylinder 51a, the expanding plate 50 moves forwards integrally with the cylinder rod 51, hence the expanding plate 50 would push the slide flange members 33 and 43 forwards against the resilient forces of the compression springs 34 and 44, and as a result, the intervals between the slide flange members 33 and 43 and the flange portions 31 and 41 can be enlarged. On the contrary, by retracting the cylinder rod 51 backwards, the slide flange members 33 and 43 are pushed backwards by the compression springs 34 and 44, and thereby the intervals between the slide flange members 33 and 43 and the flange portions 31 and 41 are reduced. Since the stroke of the cylinder rod 51 is restrained by a collar 54, even in the case where the cylinder rod 51 has been retracted backwards, the expanding plate 50 does not interfere the flange portions 31 and 41.

Behind and in front of the hanging portion 50b at the center of the expanding plate 50 are positioned sector-shaped guide plates 60 and 61. A fixed shaft 62 penetrates through central lower portions of the guide plated 60 and 61, and the rear guide plate 60 is fixed at a predetermined position on the fixed shaft 62. The front guide plate 61 is supported from the fixed shaft 62 so as to be freely slidable in the back and forth directions, and a compression spring 63 is provided between a receiving metal 64 fixed to the tip end portion of the fixed shaft by means of a nut 65 and the guide plate 61 to always bias the guide plate 61 backwardly.

Under the assembled condition, behind and in front of the hanging portion 50b of the expanding plate 50 are positioned the upper portions 60a and 61a of the guide plates 60 and 61, respectively, the front surface of the guide plate 60 lies on the same vertical plane as the front surfaces of the flange portions 31 and 41 at a fixed position. The rear surface of the guide plate 61 abuts against the front surface of the expanding plate 50 and thus lies on the same vertical plane as the rear surfaces of the slide flange members 33 and 43. Accordingly, if the cylinder rod 51 projects forwards, then the expanding plate 50 pushes the guide plate 61 also forwardly together with the slide flange members 33 and 43, and thereby enlarges the interval between the guide plate 60 and the guide plate 61. This interval is always equal to the intervals between the flange portion 31 and the slide flange member 33 and between the flange portion 41 and the slide flange member 43, and the bead 2 would pass through this interval.

It is to be noted that the above-described push-up roller 21 is positioned to have its upper portion pinched a little between the guide plate 60 and the guide plate 61 (See FIG. 4). In addition, on the left side (as viewed in FIG. 2) of the push-up roller 21 is positioned a scraper 23, and on the right side thereof is positioned a scraper 24. The scrapers 23 and 24 are prepared by bending rectangular plates into L-shape and forming claws 23a and 24a, respectively, and the claws 23a and 24a are projected upwards up to predetermined positions with their vertical inside surfaces fixedly secured to the rear surface and the front surface, respectively, of the above-mentioned support table. The respective claws 23a and 24a are adapted to fit in notches 60b and 61b, respectively, formed on the lower surfaces of the above-described guide plates 60 and 61.

In the following, the process of covering the bead 2 with the tape 3 will be explained with reference to FIGS. 7 and 8.

When the bead 2 is set in the tape covering apparatus 1, at first the elevator table 26 is lowered by driving the elevator cylinder 27. Then the cylinder rod 51 is projected to push out the slide flange members 33 and 43 and the guide plate 61 forwards via the expanding plate 50, and thereby the intervals between the flange portions 31 and 41 and the guide plate 61 are held opened.

Under this condition, the bead 2 can be easily set. More particularly, the upper portion of the bead 2 is supported by the rods 15 and the lower portion thereof is supported by free rollers 18 and 19 disposed on the left of the drive roller 30 and on the right of the drive roller 40, respectively. Then, when the elevator table 26 is raised up to a predetermined position by driving the elevator cylinder 27, the bead push-up rollers 20, 21 and 22 would push up the bead 2 in contact with the lower outer circumferential surface of the bead 2. The inner circumferential surface of the bead 2 is pushed against the drive rollers 30 and 40. Here, if the cylinder rod 51 is retracted, then the slide flange members 33 and 43 as well as the guide plate 61 are moved backwards by the resilient forces of the compression springs 34, 44 and 63, so that they can pinch the side surfaces of the bead 2 from its front and rear sides.

Subsequently, if the drive rollers 30 and 40 are rotated in the counter-clockwise direction, the bead 2 also rotated in the counter-clockwise direction.

On the other hand, the tape 3 fed from the reel 4 through the length measuring device 5 and the drive roller 6 is brought into press contact with the inner circumferential surface of the bead 2 by the press roller 8 held in contact with the inner circumferential surface of the bead. It is stuck onto the inner circumferential surface of the bead 2 while being drawn out by the rotating bead 2.

Figure 7:
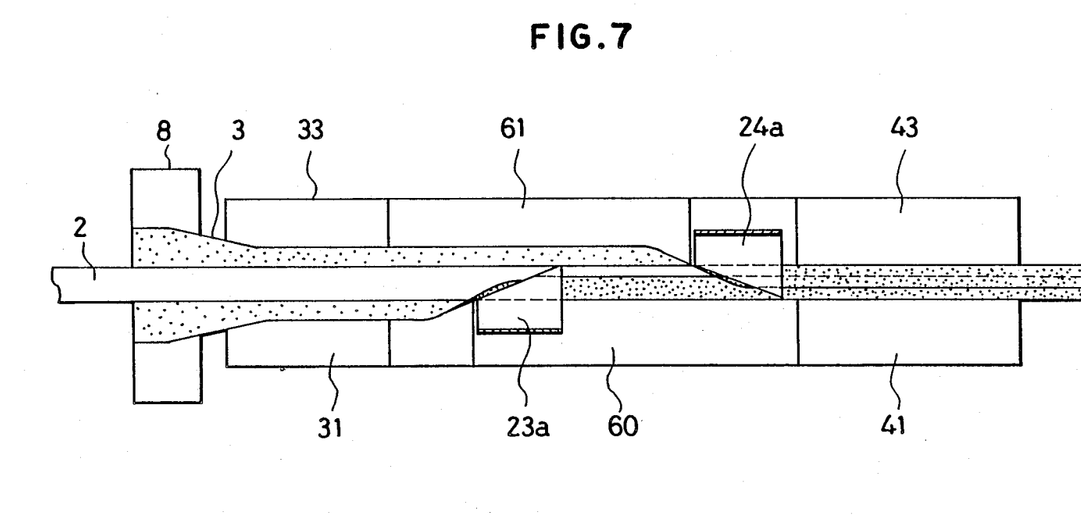
FIG. 7 is a cross-section view taken along line VII—VII in FIG. 2.

Here it is to be noted that FIG. 7 is a cross-section view taken along line VII—VII in FIG. 2 in which the process of covering the bead 2 with the tape 3 was observed from the below, and FIGS. 8a to 8f are cross-section views of the successive steps in the process of covering the bead as viewed from the front side in the direction of traveling of the bead.

Figure 8A:
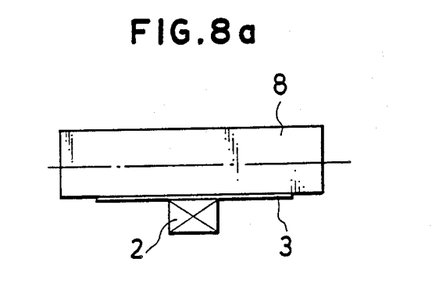
FIG. 8a to 8f are schematic views showing the successive steps in the process of covering a bead with a tape.
Figure 8B:
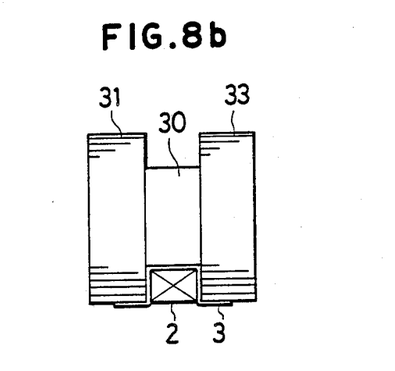

The state of sticking the tape 3 onto the inner circumferential surface of the bead 2 by means of the press roller 8 is illustrated in the lefthand portion of FIG. 7 and in FIG. 8a. When the bead 2 reaches the drive roller 30 jointly with the tape 3 stuck onto the inner circumferential surface thereof, it is pinched between the flange portion 31 and the slide flange member 33 on the opposite sides. At the same time, the opposite side edge portions of the tape 3 are stuck onto the opposite side surfaces of the bead 2 by means of the flange portion 31 and the slide flange member 33 (FIG. 8b). It is to be noted that at this time the opposite side edge portions of the tape 3 still have margins, and owing to a tape tension they lie along the outer circumferential surfaces of the flange portion 31 and the slide flange member 33. Because of this tape tension, sticking of the tape 3 onto the opposite side portions of the bead 2 can be achieved under a tensioned state.

Figure 8C:
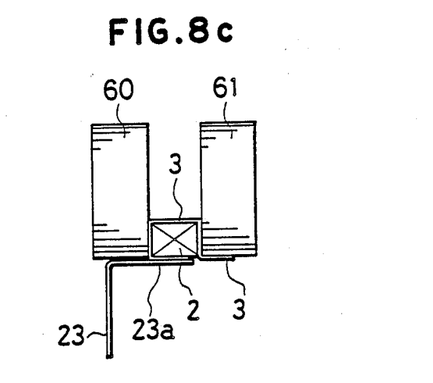

Subsequently, under the above-mentioned condition, the bead 2 and the tape 3 are pinched by the guide plates 60 and 61 in place of the flange portion 31 and the slide flange member 33, and thus they come to the scraper 23. Since the claw 23a of the scraper 23 is partly fitted in the recess on the lower surface of the guide plate 60, this claw 23a scoops up the rear side edge portion of the tape 3 from the lower surface of the guide plate 60 and folds it back onto the outer circumferential surface of the bead 2 (FIG. 8c).

Figure 8D:
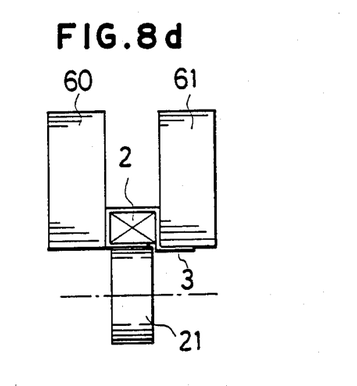

In the next stage, the rear side edge portion of the tape 3 is stuck onto the outer circumferential surface of the bead 2 by pressing the folded back portion of the tape 3 from below with the aid of the bead push-up roller 21 (FIG. 8d).

Figure 8E:
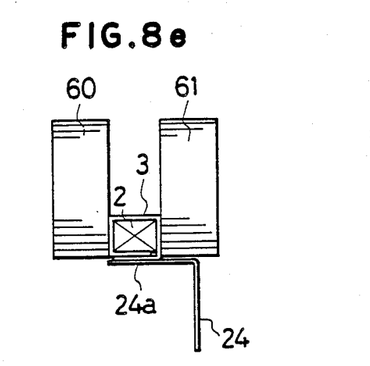

Next, when the tape 3 and the bead 2 has come to the scraper 24, now the claw 24a scoops up the front side edge portion of the tape 3 from the lower surface of the guide plate 61 and folds it back onto the outer circumferential surface of the bead 2 in superposition on the already folded and stuck rear side edge portion of the tape 3 (FIG. 8e).

Figure 8F:
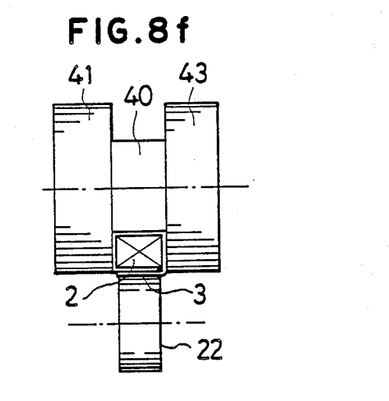

By pressing the superposed folded back portion of the tape 3 from below by means of the bead push-up roller 22 in the next stage, the front side edge portion of the tape 3 can be also stuck onto the outer circumferential surface of the bead 2 (FIG. 8f).

In this way, the tape 3 is made to cover the entire circumference of the bead 2.

It is to be noted that the length of the tape being fed is measured by the length measuring device 5 disposed in the midway of the tape feeding route, and at the point in time point when the tape has been fed by the length corresponding to the diameter of the bead, the cutter 9 is actuated to cut the tape 3 into a predetermined length.

After the actuation of the cutter 9, the tape 3 is folded back and stuck until the tail end of the tape appears, and when the tail end of the tape has passed the bead push-up roller 22, the drive rollers 30 and 40 are stopped. Subsequently, the above-described cylinder rod 51 projects, hence the slide flange members 33 and 43 as well as the guide plate 61 are pushed forwards via the expanding plate 50. Thus, the intervals between the flange portion 31 and the slide flange member 33, between the flange portion 41 and the slide flange member 43 and between the guide plate 60 and the guide plate 61 which were pinching the bead 2 from the opposite sides, are expanded. Further, the elevator table 26 is lowered to release the lower and of the bead 2. If the rods 15 are turned down by driving the rotor 16, the bead 2 can be automatically taken out of the subject apparatus as falling down by its own weight, and then a series of cycles are terminated.

As described above, in the tape covering apparatus 1 according to the present invention, since the covering work with a tape can be achieved by means of a simple construction consisting of a very few component elements such that two rollers 30 and 40 having flange portions and two scrapers are appropriately disposed, it is possible to reduce a number of component members and to greatly lower a manufacturing cost (to about one-half of that in the prior art).

Since one of the flange portions pinching the bead 2 from the opposite sides is made slidable and biased by means of a spring, distribution of the widths of the beads can be automatically dealt with, adjustment of an interval between flange portions becomes unnecessary, hence the time required for switching the size of the beads can be shortened, and at the same time, automation of switching of the size has become possible.

In addition, since the insert and take-out of beads are effected under the condition where the interval between the flanges is expanded, inconvenience such as no-good insert, no-good take-out or the like would not occur.

Furthermore, by interlocking the operations of expanding the interval between the flanges, lowering the bead push-up rollers 20, 21 and 22 and swinging the rods 15 upon taking out the bead, the take-out operation of the bead can be automated.

It is to be noted that since the tape is at first stuck onto the inner circumferential surface of the bead and then folded back towards the outer circumferential surface, the tape is folded back and stuck as being stretched towards the larger diameter portion, hence the bead is covered with the tape without generating creases under a tensioned condition, and the finished state is favorable.

What is claimed is:

1. An apparatus for covering a tire bead with a tape comprising:
    drive rollers held in contact with an inner circumferential surface of a rotably supported annular tire bead to rotate the tire bead;
    tape feed means for sticking a tape onto the inner circumferential surface of said rotating bead while feeding the tape;
    flange members fitted around said drive rollers so as to be slidable in their axial direction for cooperating with flange portions provided on said drive rollers so that they may pinch said bead jointly with said fed tape from the opposite sides to stick the tape onto the side surfaces of the bead;
    biasing means for biasing said flange members so as to reduce the intervals between said flange portions and flange members;
    a movable plate having circular notches somewhat larger in diameter than said rollers, disposed as directed in a transverse direction straddling said drive rollers from the above, and movable in the axial direction to expand the intervals between said flange portions and said flange members against said biasing means; and
    tape fold-back means for folding back edge portions of the tape onto the outer circumferential surface of said bead.

2. An apparatus as claimed in claim 1, further providing a plurality of bead push up rollers which are movable in the vertical direction to support said bead.

3. An apparatus as claimed in claim 1, wherein said drive rollers are disposed two along the inner circumferential surface of the bead.

4. An apparatus for covering a tire bead with a tape comprising:
    drive rollers held in contact with an inner circumferential surface of a rotatably supported annular tire bead to rotate the tire bead;
    tape feed means for sticking a tape onto the inner circumferential surface of said rotating bead while feeding the tape;
    flange members fitted around said drive rollers so as to be slidable in their axial direction of cooperating with flange portions provided on said drive rollers so that they may pinch said bead jointly with said fed tape from the opposite sides to stick the tape onto the side surfaces of the bead, said flange members and flange portions having outer circumferential surfaces for supporting side edge portions of the tape;
    guide plates positioned adjacent to said flange members and flange portions on the opposite sides of said bead, said guide plates having upper and lower surfaces;
    biasing means for biasing said flange member so as to reduce the intervals between said flange portions and flange members;
    movable means for expanding the intervals between said flange potions and said flange members against said biasing means; and
    tape fold-back means for holding back edge portions of the tape on said lower surfaces of said guide plates onto the outer circumferential surface of said bead.

5. An apparatus as claimed in claim 4, wherein said tape fold-back means is composed of scraper members having claws disposed along said lower surfaces of said guide plates for scooping up said edge portions of the tape from said lower surfaces and folding it back onto the outer circumferential surface of said bead.

6. An apparatus as claimed in claim 5, wherein said tape fold-back means includes a first scraper member for folding back one side edge portion of the tape, and a second scraper member for folding back the other side edge portion of the tape.

7. An apparatus as claimed in claim 4, wherein the interval between said guide plates is variable.

8. An apparatus as claimed in claim 4, further providing a plurality of bead push up rollers which are movable in the vertical direction to support said bead.

9. An apparatus as claimed in claim 4, wherein said drive rollers are disposed two along the inner circumferential surface of the bead.

* * * * *